United States Patent [19]

Eloranta et al.

[11] 3,967,297
[45] June 29, 1976

[54] INTERLOCK MECHANISM FOR PHOTOGRAPHIC PROCESSNG SYSTEM

[75] Inventors: Vaito K. Eloranta, Needham; Benjamin C. Ruggles, Gloucester, both of Mass.

[73] Assignee: Polaroid Corporation, Cambridge, Mass.

[22] Filed: Dec. 23, 1974

[21] Appl. No.: 535,378

[52] U.S. Cl. .................... 354/83; 354/86; 354/212
[51] Int. Cl.² ................................ G03B 17/50
[58] Field of Search ............ 354/83, 86, 212, 213, 354/206

[56] References Cited
UNITED STATES PATENTS

| | | | |
|---|---|---|---|
| 3,563,145 | 2/1971 | Bendoni | 354/206 X |
| 3,709,122 | 1/1973 | Blinow | 354/83 X |
| 3,757,657 | 9/1973 | Eloranta et al. | 354/86 |
| 3,810,210 | 5/1974 | Adamski et al. | 354/83 X |

*Primary Examiner*—R.L. Moses
*Attorney, Agent, or Firm*—Frank J. Caufield

[57] ABSTRACT

An interlock mechanism is provided for use as an adjunct with a camera having a shutter and a lanyard operated film advancing and processing system which utilizes a film cassette contaning, in stacked relationship, a dark slide and a plurality of self-processable film units. Each film unit is adapted to be exposed and then processed in a consecutive sequence. The interlock mechanism functions to preserve the proper operating sequence and prevents the camera user from performing anomalous operations which could result in film losses due to the processing of non-exposed film units.

21 Claims, 6 Drawing Figures

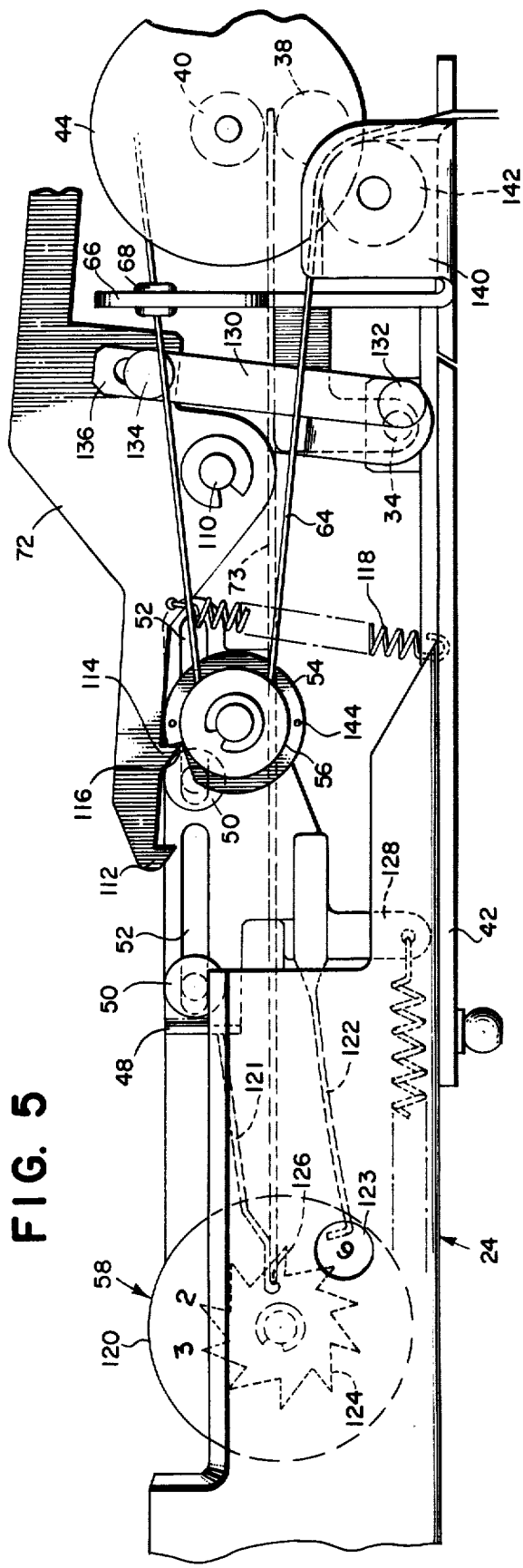
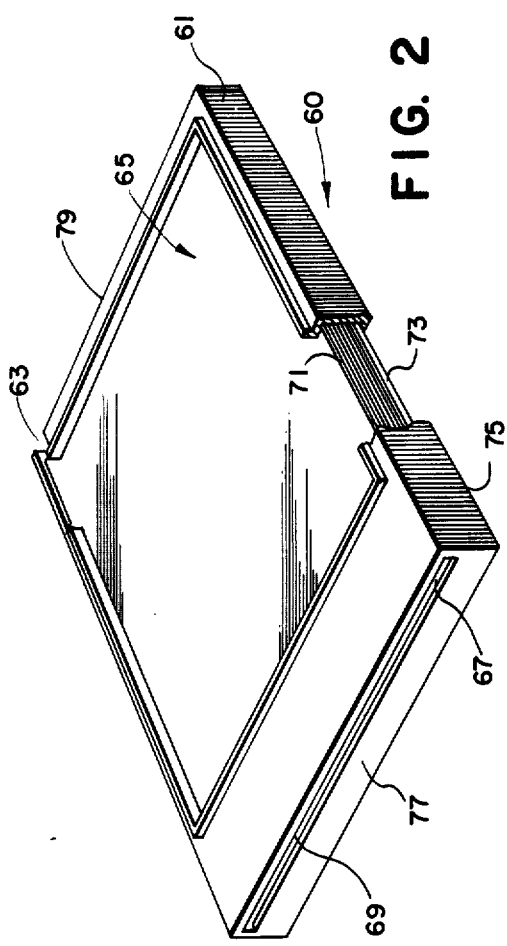

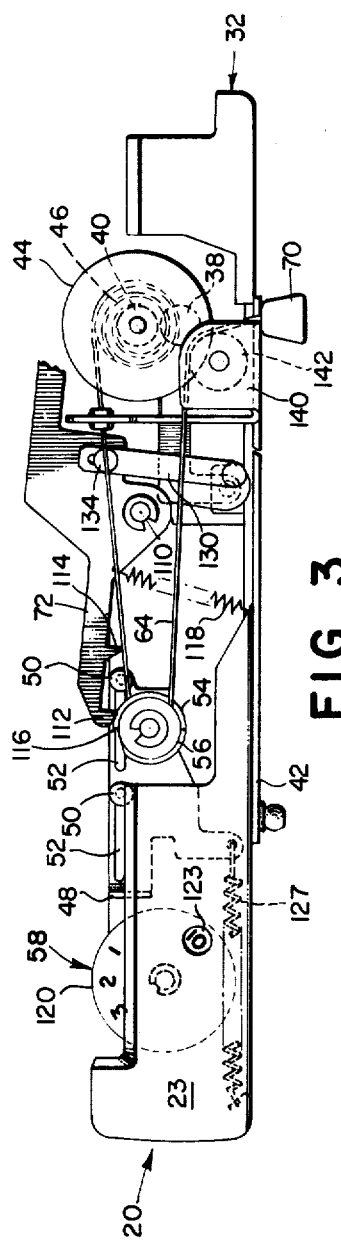
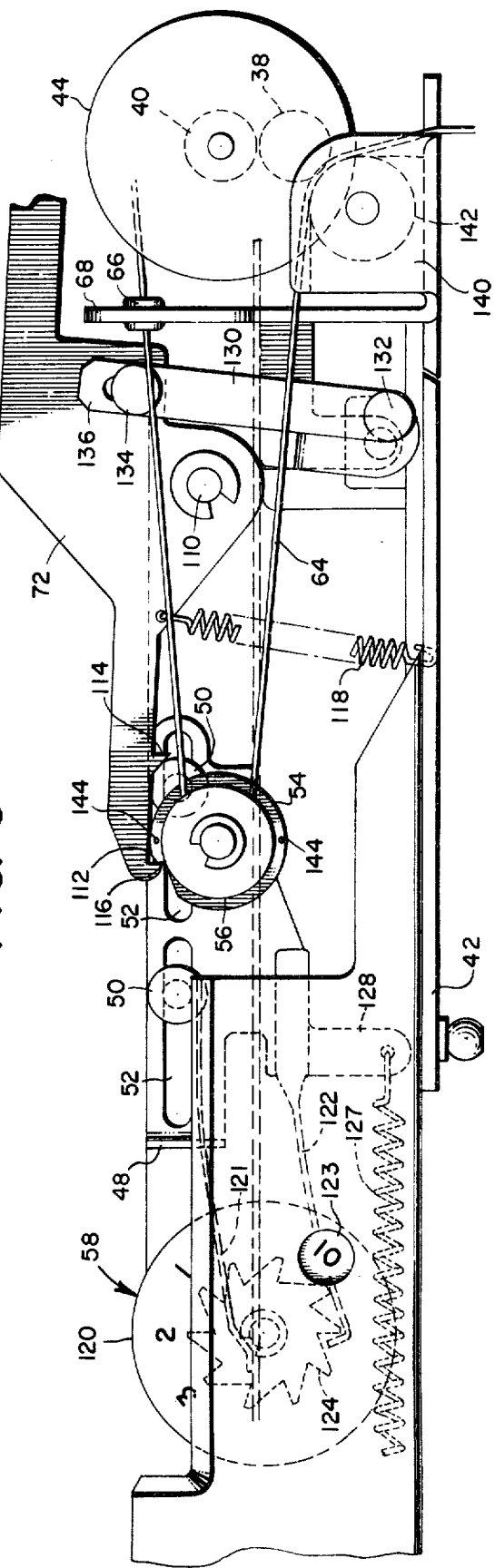

INTERLOCK MECHANISM FOR PHOTOGRAPHIC PROCESSNG SYSTEM

CROSS REFERENCES TO RELATED APPLICATIONS

This application is related to copending application Ser. No. 535,377 filed concurrently herewith by Vaito K. Eloranta entitled "Manually Operated Photographic Processing System."

BACKGROUND OF THE INVENTION

1. Field of the Invention

This invention relates generally to photographic apparatus and particularly to an interlock mechanism for use as an adjunct with a manually operated processing system to prevent the processing of non-exposed film units.

2. Description of the Prior Art

Manually operable photographic systems for consecutively exposing and processing a plurality of film units generally include interlock mechanisms that safeguard against the occurrence of anomalous user operations which result in picture losses. In cases where film units are of the self-processable type, it is a typical system requirement that processing occur following exposure and before a subsequent exposure can be made. With such film it is, therefore, a necessity to provide a processing system with intrinsic constraints that forces the user to act in a manner consistent with the logic of the system. The present invention when used as an adjunct with the processing system described in the above cross-referenced U.S. application Ser. No. 535,377 provides such a safeguard. The processing system in that application is intended for use with a type of film cassette that basically comprises a box-like plastic housing containing a stack of self-processable film units as, for example, described in U.S. Pat. No. 3,415,644 issued to Edwin H. Land on Dec. 10, 1968, and entitled NOVEL PHOTOGRAPHIC PRODUCTS AND PROCESSES. In these type cassettes each film unit is adapted to be consecutively exposed and subsequently withdrawn through an exit slot in the cassette and, afterwards, processed by being transported between a pressure generating nip defined by a pair of juxtaposed rollers located exterior to the cassette in close proximity to the exit slot.

The functions that a processing system must perform in order to satisfy the requirements imposed by such a film cassette are to: (1) selectively engage an individual exposed film unit within the cassette; (2) advance the engaged film unit from the cassette through its exit slot and into contact with the rollers; (3) rotate the rollers so that they further advance the film unit and process it as it is being moved by and through them; and (4) reinitiate the cycle to repeat the process in subsequent film units. Additionally, an energy source must be provided to supply the power required to drive the system.

In known manually driven processing systems for use with cassettes such as that described in U.S. application Ser. No. 485,795 entitled PHOTOGRAPHIC FILM CASSETTE, filed on July 5, 1974, by Nicholas Gold, the mode of operation after exposure may be described as follows: (1) the rollers are caused to rotate by some suitable manual power input such as a crank or lanyard; (2) a film advance is initially driveably connected to the power input such that it moves an exposed film unit out of the cassette and into engagement with the rotating rollers; (3) a clutch or cam mechanism interrupts the driving relationship between the film advance and the power input after the film unit is operatively associated with the rollers; (4) the power input continues to rotate the rollers and completes the processing of the film unit; and (5) a hold-release mechanism temporarily prevents the film advance from moving a subsequent film unit for processing until the previously exposed film unit has been processed and the release feature activated. Systems in the prior art exhibiting these characteristics are, for example, U.S. Pat. No. 3,757,657 entitled MANUALLY OPERABLE FILM-ADVANCING APPARATUS issued to Vaito K. Eloranta and Benjamin C. Ruggles on Sept. 11, 1973, and U.S. Pat. No. 3,810,210 entitled FILM UNIT PROCESSING MECHANISM issued to Henry S. Adamski and Guilford E. Kindig on May 7, 1974. The former includes a crank power input and the latter a lanyard power input.

Both of the aforementioned systems may be characterized as being relatively complex expensive mechanism since they employ the use of multiple gears and either a clutch or cam arrangement to terminate the power drive relationship between the rotating rollers and the film advance.

The present invention provides the temporary hold-release mechanism function of the prior art in a manner that is different from the prior art but consistent with the operating principle of a processing system described, for, example, in the aforementioned related U.S. application Ser. No. 535,377. As a consequence of the combination of the instant invention with a processing system such as that referred to, it is felt for reasons that will become apparent, that a relatively simple inexpensive interlock mechanism has been provided.

SUMMARY OF THE INVENTION

The present invention relates to an interlock mechanism for use as an adjunct with a camera having a shutter and a manually operated film advancing and processing system which utilizes a cassette containing a stack of self-processable film units.

The cassette is the type which basically comprises a stack of self-processable film units contained in a box-like housing constructed of a suitable opaque plastic material. The housing includes an exposure aperture, a film exit slot, and an access hole that provides a means for inserting part of the film advancing and processing system to remove a film unit from the cassette.

The structure of the housing and the arrangement of the film units within it require that processing occur following exposure and before a subsequent exposure can be made. Each film unit is thus adapted to be exposed and processed in a consecutive sequence.

Each film unit, after exposure, is adapted to be subsequently withdrawn through the exit slot in the cassette and processed by being transported between a pressure generating nip defined by a pair of juxtaposed rollers located exterior to the cassette and in close proximity to the exit slot.

The interlock mechanism functions to preserve the operating sequence and prevents the camera user from performing anomalous operations which could result in picture losses due to non-exposure of the film unit or multiple processing attempts.

The processing system comprises an open-ended housing configured to receive and support the cassette in a position to facilitate exposure. Adjacent the open end of the housing, a loading door is rotatably mounted therewith for movement between an open and a closed position. Mounted on the loading door is a pair of juxtaposed pressure rollers resiliently biased toward one another to define a nip through which a film unit is advanced to effectuate its processing. The nip of the rollers is brought into substantial alignment with the exit slot of the cassette when the loading door is moved into its closed position to secure a cassette disposed within the housing.

One of the rollers has a pulley affixed thereto to accept energy for rotatably driving it such that a film unit disposed against the roller nip is advanced through the rollers and processed thereby.

An exposed film unit is moved from the cassette and into the roller nip by means of a film advance assembly mounted for slidable movement on the housing between a first position corresponding to the location where the film unit is exposed and a second position corresponding to the location where it, i.e., the film unit, is engaged with the rollers. The film advance assembly includes a pick slide having a film pack mounted thereon and adapted to enter the access hole in the cassette and engage an exposed film unit. A spring continuously urges the film advance assembly toward its first position.

Mounted on the pick slide for linear movement therewith is a second pulley and on the loading door a third pulley. A lanyard connects all three pulleys in such a way that when it is pulled by the camera user, the pull force first actuates the pick slide to move it from its first to its second position and then the pull force is transferred to drive the rollers.

Also mounted on the pick slide for movement therewith is a ratchet. A double toothed pawl arm is pivotally mounted to the housing and adapted to engage the ratchet as the pick slide brings the ratchet into engagement therewith. The two teeth, which are spaced apart by a predetermined distance, provide two holding positions in which the pick slide is temporarily locked. The first position prevents multiple processing and the second no exposure failures.

The pawl arm is actuatable by either a shutter mechanism or by the movement of the loading door into its open position. Additionally, a counter assembly mounted on the housing is actuated by the movement of the pick slide to indicate the number of useable film units remaining in the cassette.

An object of this invention is to provide an interlock mechanism for use as an adjunct with a manually operated processing system.

Another object of this invention is to provide a simplified relatively inexpensive interlock mechanism.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 2 is a diagrammatic perspective view with parts broken away of a film cassette utilized with the camera of FIG. 1;

FIG. 3 is a fragmented side elevational view, with part broken away, of the camera of FIG. 1 illustrating the instant invention as it appears when the film cassette of FIG. 2 has been loaded into a film receiving chamber and a loading door latched in its closed position;

FIG. 4 is an enlarged fragmented side elevational view, with parts broken away, of the camera of FIG. 1 illustrating the instant invention after a film advance has been moved to a second position; and FIG. 5 is an enlarged fragmental side elevational view, with parts broken away, of the camera of FIG. 1 illustrating the instant invention after a film advance has been moved to a second position.

DETAILED DESCRIPTION OF THE INVENTION

Figure 1:
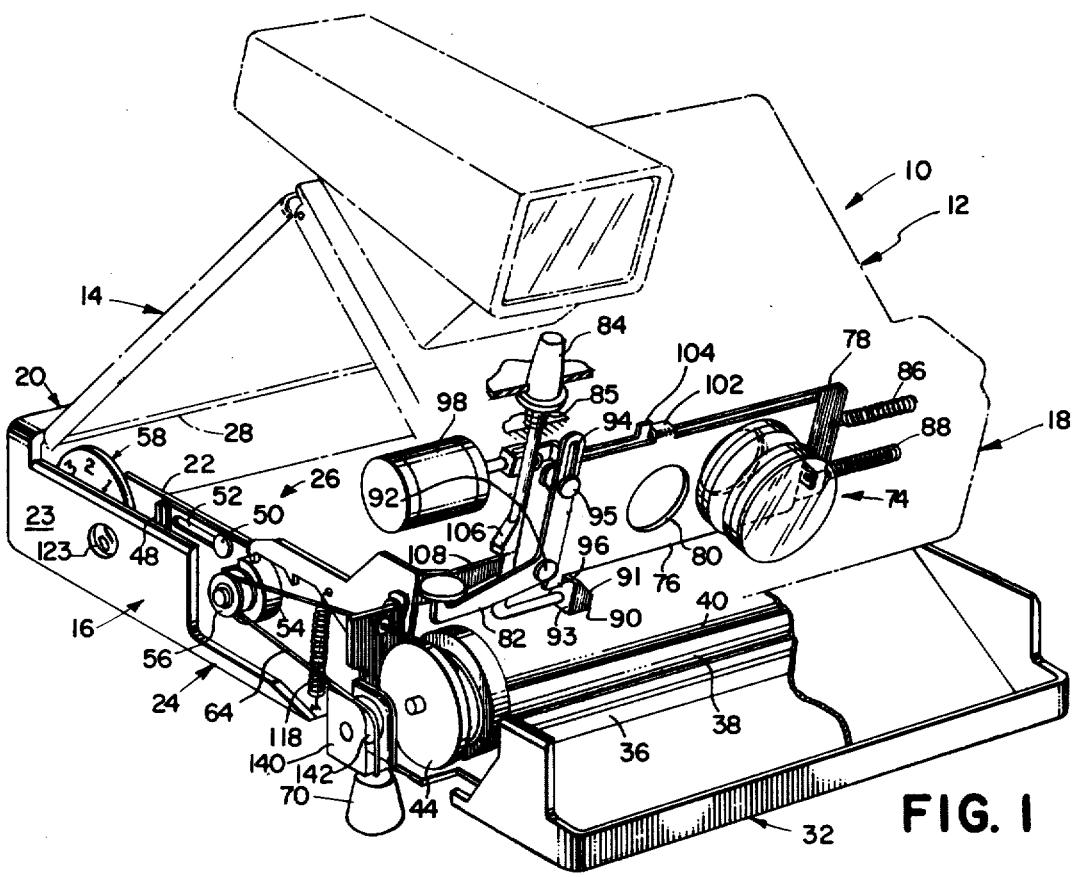
FIG. 1 is a pictoral representation of a camera embodying the interlock mechanism of the instant invention with portions broken away to reveal internal structure.

In a diffusion transfer process for producing a visible image from an exposed self-processable film unit, a fluid processing reagent is spread in a generally thin layer between a pair of superposed photographic sheet elements forming part of the film unit. The processing fluid is stored in a pressure rupturable container forming an integral part of film unit, located adjacent a leading edge of the exposed area, and adapted to release its contents between the sheet elements when under the influence of an applied hydraulic pressure. Such film units, as described in considerable detail, for example, in U.S. Pat. No. 3,415,644, normally contain all the photographic components necessary to carry out this process.

Recently such film units, as a consequence of changes in component photochemical and physical properties, have been manufactured as integrated composite laminated structures which, after exposure and processing, result in a waste-free finished print. This particular structural configuration has permitted their assembly in stacks within compact box-like plastic cassettes where they are adapted to be exposed and processed in a consecutive fashion. Photographic apparatus utilized with such film cassettes must functionally conform to the particular limitations imposed by the cassette structure, viz., consecutiveness. This results because the stacked relationship of one film unit over another, in the usual case, requires the removal of an exposed film unit before a successive film unit can be exposed. Although processing need not occur immediately after exposure, it normally does by advancing the exposed film unit from the cassette and into engagement with a pair of juxtaposed rollers which define a pressure generating nip through which the film unit is advanced, and as a result of advancement, the processing reagent is spread between predetermined elements of the composite structure.

Apparatus that can carry out the logical sequence of required operations may obviously exist as a fully automatic system or may require manual operation. In the latter case, it is necessary to provide the apparatus with intrinsic constraints that force the user to act in a manner consistent with the required logic. Otherwise, anomalous user operations may occur which could result in picture losses; e.g., processing an unexposed picture. Such built-in safeguards are usually called interlock devices because the occurrence of the event in a sequence is conditioned upon successful completion of a prior event.

The foregoing comments briefly summarize the environment within which the present invention may operate. In particular, it is a manually operable mechanism that:

1. advances and processes and exposed self-processable film unit in response to a single manual user operation, and 2. prevents inappropriate use with an adjunct interlock mechanism.

To understand the invention, its mode of operation, and manner of construction, reference is now made to the various drawings.

Figure 6:
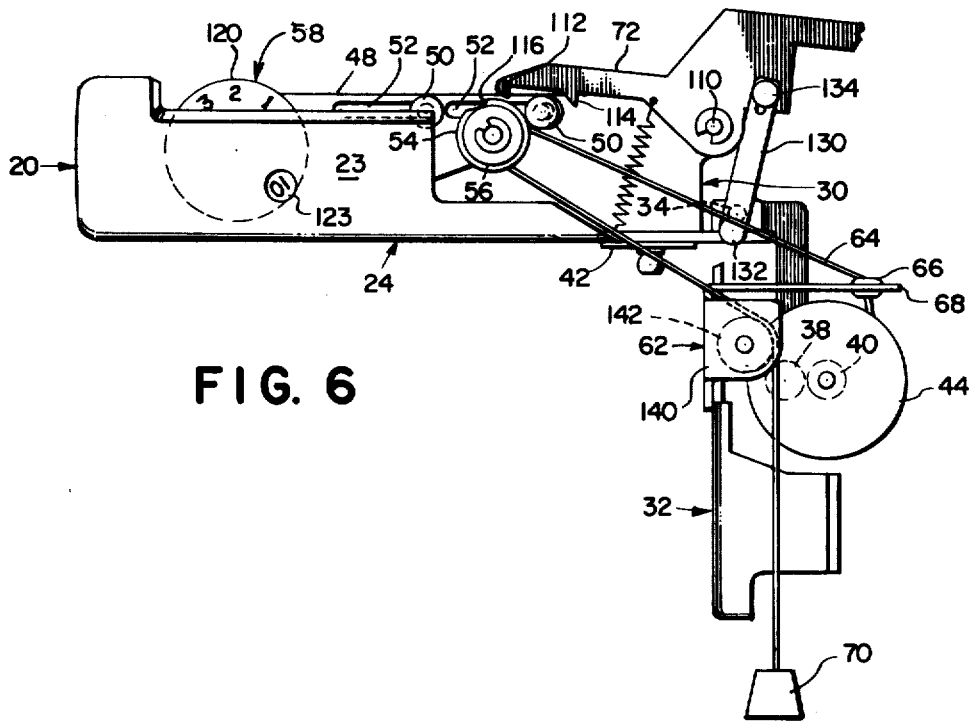
FIG. 6 is a fragmented side elevational view, with parts broken away, of the camera of FIG. 1 illustrating the instant invention with a loading door in its open position.

The invention is portrayed as being incorporated in a manually operable camera designated as 10 in FIG. 1 and intended for use with self-processable type film. Camera 10 has a generally prismatic geometry formed by a plurality of housing sections rigidly connected along their end portions. These sections include housing sections 12 and 14, base 16 which is the main structural member, and shutter housing section 18 which includes the various shutter components whose functions will be described later. Base 16, in addition to providing the primary structure for camera 10, includes a rear wall 20, two side walls 22 (only one shown), and a bottom wall 24 that form a chamber adapted to receive a film cassette 60, shown in FIG. 2, and support it in a position so that it may be exposed. In this connection, the film receiving chamber designated generally as 26 in FIG. 1 has an open end opposite its bottom wall 24 which defines an exposure plane 28 located in a position defined generally by the upper edges of the rear wall 20 and side walls 22. Chamber 26 also has another opening 30 therein opposite rear wall 20 through which film cassette 60 may be inserted or removed from cassette chamber 26. Extending forwardly from base 16 and pivotally connected thereto at pivot 34 (FIG. 6) for movement between a closed position shown in FIG. 1 and a loading position shown in FIG. 6 is a front housing section 32. Housing section 32 includes means for mounting a fluid processing and film transport assembly 36 including a pair of juxtaposed rollers 38 and 40 that are urged toward one another by resilient biasing means (not shown). Housing section 32 is locked in its closed position by means of a levered latch arm 42 (FIG. 6) pivotally mounted on wall 24 of base 16.

When in its closed position, housing section 32 positions assembly 36 in blocking relationship to chamber opening 30 thereby retaining a cassette within chamber 26 and, in addition, aligns rollers 38 and 40 in position to receive a film unit when advanced from cassette 60.

Rigidly mounted on roller 40 is a pulley 44 which provides a means for supplying input power to roller 40 in order to rotate it. Attached to pulley 44 is a torsional rewind spring 46 (See FIG. 3) that, when under load, provides a torque which constantly forces pulley 44 in a clockwise direction as viewed in FIG. 1.

Attached to the left side wall 22 (facing camera 10) are several elements that will be briefly described and identified here but whose functions will subsequently be described in detail. There is a pick slide 48 mounted for slidable on a pair of pins 50 each of which extends through elongated slots 52 (See FIG. 6) and fastened to side wall 22. Rigidly fastened to pick slide 48 is a ratchet 54. Coaxially mounted outwardly from ratchet 54 is a pully 56 which moves linearly with pick slide 48 but rotates about its mounting axis. Mounted toward rear wall 20 and adjacent inner wall 22 is a counter assembly 58 which is actuable by the movement of pick slide 48 and is used for indicating the number of useable film units remaining in cassette 60. A block and pulley assembly 62 is mounted on front housing section 32 for movement therewith.

A drive means in the form of a lanyard 64 is plurally wrapped around pulley 44 then extends rearwardly through a bushing 66 which is slidably mounted in a bracket 68 that is attached to a side wall of front housing section 32. Thereafter, the lanyard 64 is partially wrapped around pulley 56 having its direction reversed and continuing forwardly to a point where it is guided to the exterior of the camera by block and pulley assembly 62. At the end of lanyard 64 is a handle 70 that serves as a grip so that the user may pull the lanyard and as a stop which prevents the lanyard from moving inside the camera. There is a multi-actuable pawl arm 72 that is also pivotally mounted on side wall 22. Its function will likewise be elaborated on later.

Reference is now made to shutter housing section 18 and its various components. It includes a lens assembly 74 which, in conjunction with a mirror mounted on the interior of housing section 14, form a folded optical path that receives actinic radiation from a scene of interest and directs it to exposure plane 28. The duration of the exposure is regulated by an electromechanical shutter mechanism that includes a pair of blades, 76 and 78, each having similar, but offset, or staggered apertures shown as 80, for example, in blade 76. Blades 76 and 78 are held in readiness to make an exposure in an initially cocked position as illustrated in FIG. 1. The exposure cycle is initiated in response to the user actuating a shutter release shaft 84 which is spring loaded into the position shown in FIG. 1 by a return spring 85. Located on the end of shaft 84 is a blade retaining block 90 having a beveled section 91 and a flat section 93 which engages a tab 96 located on blade 76. The function of flat section 93 is to retain blade 76 in the cocked position until its release. Upon actuation of release shaft 84, flat section 93 is moved out of contact with tab 96 permitting blade 76 to move under the influence of a linear driving spring 88 so that aperture 80 in blade 76 becomes positioned over the optical axis of the camera thereby permitting light to enter the optical system. Connected to blade 76 is a cocking arm 82 which is pivotally mounted for rotation about pivot 92. Cocking arm 82 is fastened to blade 76 by a flanged pin 95 which extends through a slotted section 94 such that the movement of the blade 76 to the right causes the cocking arm 82 to move with it by rotating about pivot 92 as pin 95 slides upwardly in slotted section 94. When blade 76 reaches a rest position cocking arm 82 is in position to be actuated to reposition blade 76 in its initial cocked position. While blade 76 is in motion, blade 78 is held in position by an electromagnet 98 which is engaged with a keeper 100 on blade 78. After an appropriate exposure interval has elapsed, determined by suitable exposure control means, now shown, power to the electromagnet is terminated thereby interrupting the force holding blade 78 in place. When this occurs, blade 78 is released and moves under the influence of a linear spring 86 connected thereto to a position covering the aperture of the shutter system to reinstate the shutter blades to their cocked position as shown in FIG. 1, the user actuates cocking arm 82 thereby dragging blade 76 to the cocked position. Blade 76, in turn, has a bent over tap 102 which engages a vertical tab 104 on blade 78 so that blade 78 is also moved into the cocked position as blade 76 is moved. In this respect as blades 76 and 78 are moved toward the cocked position, tab 96 on blade 76 engages beveled section 91 of blade retaining block 90 causing a wedging action to occur between them which forces shutter release shaft 84 downwardly thus permitting tab 96 to ride up over beveled section 91 until tab 96 reaches flat section 93 of blade retaining block 90. When this occurs, flat section 93 and tab 96 are in a non-interfering position of alignment which permits shutter release shaft 84 to return to its original position under the influence of return spring 85. This action being completed causes the blades to be retained in the cocked position.

Shutter release shaft 84, in addition, has a tab 106 adapted to engage a complementary extended section 108 on pawl arm 72. It will be noted that tab 106 and extended section 108 are initially spaced apart while the shutter is in a cocked position. This spacing is chosen to be equal to greater than the travel that shutter release 84 undergoes during its recock cycle. As a consequence of this design, pawl arm 72 is rotated about its axis of rotation 110 only when release shaft 84 is depressed to initiate an exposure. This particular feature is important since, as will be seen, it provides one of the interlock functions mentioned earlier.

The description so far has pointed out many of the elements that comprise the invention by briefly identifying them and pointing out how they are connected. Since the invention will be utilized with film cassettes having structure which imposes consecutive logic on the apparatus, such a cassette will now be described. Referring to FIG. 2, the cassette 60 is seen to include a box-like housing 61, preferably made of an opaque plastic material, having an exposure aperture 65 and an access hole 63 located in one of its major dimensional walls. Located within housing 61 are arranged in stacked relationship are a plurality of photosensitive self-processable film units 73. At the top of the stack, immediately adjacent aperture 65, is an opaque dark slide 71. The entire stack, dark slide 71 and film units 73, is resiliently urged toward exposure aperture 65 by a framelike spring (not shown) located intermediate the stack and a bottom wall 75 of housing 61. Front wall 77 has an elongated slot 67 therein through which selective ones of the film units 73 are adapted to be advanced. Covering slot 67 is a flexible light seal 69. The entire cassette is thus initially light tight until it is inserted into chamber 26 and dark slide 71 is removed. When this happens, a forwardmost one of film units 73 is in readiness for exposure. It is therefore important that the apparatus be capable of effectively removing this dark slide 71 after cassette 60 is loaded into camera 10.

The actual loaading of cassette 60 is accomplished by inserting it through opening 30 in film chamber 26 when front housing section 32 is in its loading position. In this respect, cassette 60 is pushed toward the rear of chamber 26 where it seats on rear wall 20. After seating, front housing section 32 is moved to its closed position and latched to secure cassette 60 in an exposure position. It is obvious that a clear unobstructed path must be provided for cassette 60 during its movement toward rear wall 20. Therefore, any means for advancing a film unit must not be in a position to interfere with the movement of cassette 60 during its loading into camera 10. How this is accomplished will be apparent later. After being loaded and secured within film chamber 26, dark slide 71 is then removed by operation of the lanyard 64 to ready a forwardmost film unit for exposure.

Function and Mode of Operation

Up to this point we have discussed the general structure of the invention, its operating environment, its design requirements, the nature of a film cassette to be used with it, and the manner in which the cassette is loaded into a film chamber forming part of the invention. We will now describe how the various parts previously outlined, along with newly described parts, function to carry out the operations necessary to fulfill the design requirements. In doing so, reference will be made to FIGS. 3, 4, and 5.

FIG. 3 shows the invention immediately after cassette 60 has been loaded into film chamber 26 and front housing section 32 has been latched in its closed position. Of particular interest here is the relative position of pawl arm 72 with respect to a detent 116 in ratchet 54. Note that pawl arm 72 has a rearwardmost tooth 112 and a forwardmost tooth 114 adapted to drop into detent 116 when pick slide 48 is moved forwardly along elongated slots 52 because pawl arm 72 is resiliently biased about its axis of rotation 110 in a counterclockwise direction by an extension spring 118 connected between it and base 16. Also notice in FIG. 3 that counter assembly 58 includes a number wheel 120 having a plurality of numerals thereon circumferentially spaced so that when the counter is actuated by the movement of pick slide 48, a numeral is displayed through a circular window 123 formed in an outer wall 23 which is spaced parallel to wall 22 and contiguous with wall 22, base 16, and rear wall 20. In addition to the numerals on wheel 120, one space is a red dot which used to indicate that dark slide 71 is ready to be removed. Otherwise, the numerals are arranged to be displayed in descending fashion thus telling the user how many useable film units remain. FIG. 4 shows additional features which will now be described. Notice that pick slide 48 includes two spring levered members rigidly attached thereto so that they move whenever pick slide 48 moves. The first is a film picking arm 121 that is adapted to enter access hole 63 of cassette 60 to engage a trailing edge 126 of either dark slide 71 or one of the film units 73. It is constructed to be a cantilevered spring which constantly exerts a force toward base 24 when displaced in a counter direction. As such it would normally interfere with the insertion of a cassette into film chamber 26 if not removed to its rearward position as shown prior to loading a cassette.

The second member of a counter pawl arm 122 having a similar construction to arm 121 but adapted to engage a counter ratchet wheel 124 to which number wheel 120 is rigidly attached for rotational movement therewith.

Also notice an extensive extension 127 attached at one end to pick slide 48 at a tab 128 extending therefrom, and at the other end, to rear wall 20. One of the functions of this spring is to continuously urge pick slide 48 toward its rearwardmost position whenever not under the influence of a counterapplied force of greater magnitude than that exerted by spring 127.

The principle mode of operation will now be taken up. The user, after loading a cassette and latching housing section 32 in its closed position, may first initialize counter assembly 58 to indicate dark slide 71 is ready to be removed if the indicator is, for some reason, out of sequence. This is accomplished by simply manually rotating number wheel 120 in a counterclockwise direction until the red dot appears in counter window 123. Afterwards, the removal of dark slide 71 is effected when the user pulls lanyard 64 until it stops.

When a force is applied to lanyard 64, a tension is created in the lanyard that is transmitted to pulleys 44 and 56. It is the interaction between this tension and the resisting forces offered by springs 46 and 127 that account for the sequential operation of the invention. The net effect of this interaction of forces is to first cause pulley 56 to be moved to the right whereby pick slide 48 is moved from its rearwardmost location, where film pick 121 is engaged with trailing edge 126 of dark slide 71, to a forward position where a leading edge 129 of dark slide 71 is brought into engagement between the nip formed between rollers 38 and 40. Thus the pick slider 48, the pulley 56, and the picking arm 121 cooperate to define a means for advancing a film unit into engagement with the nip between the rollers 38 and 40. The nip between rollers 38 and 40 temporarily blocks further movement of dark slide 71 until the tension in lanyard 64 drives pulley 44 causing it to be rotated counterclockwise to provide power to drive roller 40 to which it is connected. When roller 40 begins to rotate, it bits leading edge 129 to force it between rollers 38 and 40. Continued rotation of roller 40, in conjunction with the normal force caused by the resilient biasing means forcing the two rollers, 38 and 40, toward each other, provide a traction force which moves dark slide 71 through them. To understand how this force interaction works, it is necessary to know that the resistance force offered by rewind spring 46 is higher than that offered by return spring 127 in combination with any frictional resisting forces caused by either dark slide 71 or film units 73 as they are being moved from cassette 60. Therefore, as the tension is created in lanyard 64, it first acts to overcome the later mentioned forces thus causing pick slide 48 and dark slide 71 to be driven forwardly. When this is happening, the higher resistance offered by rewind spring 46 acts as though it were an anchor point for lanyard 64. However, when dark slide 71 is blocked by nip between rollers 38 and 40, pulley 56 acts as the system anchor point and the continued application of an increasing pull force by the user eventually reaches a level sufficient to overcome the resistance offered by rewind spring 46. It should be noted that even though pulley 56 becomes a relatively hard or fixed point when dark slide 71 is blocked by the roller nip, it is always forcing dark slide 71 into said rollers such that, when they are rotated, dark slide 71 is to be moved through them. It should be obvious that what has been said about the movement of the dark slide applies equally as well to the film units 73. The principle of operation of the system thus depends on a transfer of a manually applied pull force to first move pick slide 48 from a first position to a second position where a film unit or dark slide is disposed between the nip of the rollers, and then, to rotate at least one of the pair of rollers to cause the film unit or dark slide to be advanced by and between them.

As mentioned earlier, pick slide 48, during its movement, interacts with pawl arm 72 and actuates counter assembly 58. There two aspects will now be discussed. FIG. 3 shows the initial position of pick slide 48 prior to actuation. When actuated, it moves forwardly a predetermined distance where tooth 112 of pawl arm 72 engages detent 116 of ratchet 54. In this position, pick slide 48 is prevented from moving rearward under the influence of return spring 127. This feature prevents the user from attempting to process an unexposed firm unit. Or stated differently, once the user has committed himself to process an exposed film unit, he must carry through with that decision, even it he releases lanyard 64, before another film unit can be exposed. As a result of moving this predetermined distance, shown in FIG. 4, counter ratchet 124 which is temporarily engaged with counter pawl 122 is rotated to indicate one less availabe film unit. The amount of rotation of ratchet 124 is determined by a suitable detent means, not shown, which also serves to retain ratchet 124 in position to be engaged again. As pick slide 48 is moved further, the second tooth, 114 of pawl arm 72 engages detent 116 of ratchet 54 (FIG. 5) thus holding pick slide 48 in a forward position until it is released by disengaging tooth 114 from detent 116. As a consequence of pick slide 48 having been moved to this forward position, the leading edge 129 of either dark slide 71 or a film unit 73 is brought into engagement with the nip formed between rollers 38 and 40. It will be remembered that being thus engaged, a film unit is in position to be processed as the user continues to apply a pull force to lanyard 64. The release of tooth 114 from detent 116 is accomplished in one of two ways. The first is in response to actuation of shutter release shaft 84. Depressing shutter release shaft 84, therefore, is a necessary condition which must be satisfied. This first release, consequently, provides an exposure interlock function since the user must make an exposure before he can process a film unit. The second way this release may be effected is by moving front housing section 32 to its loading position. Referring to FIG. 6, it can be seen that as front housing section 32 is rotated about its pivot 34, a connecting arm 130, which is eccentrically pinned at a pivot 132 to housing section 32 on one end and to pawl arm 72 by means of a pin 134 and slot 136, causes pawl arm 72 to be rotated about pivot 110 such that tooth 114 is moved out of engagement with detent 116. Thus, every thme front housing section 32 is moved in order to load a film cassette into camera 10, pick slide 48 and film pack 121 are automatically moved by spring 127 to the rear of film chamber 26 thus providing an unobstructed path for loading a cassette into film chamber 26 and also preparing for thc removal of dark slide 71.

In connection with guiding and retaining lanyard 64 in position, a pair of pins 144 are mounted in ratchet 54 extending outwardly therefrom over pulley 56 (FIG. 4) to contain lanyard 64 within pulley 56. Also, lanylard guide 62 includes, as shown in FIG. 4, a block 140 and a pulley 142 that have been provided for the purpose of permitting the user to pull lanyard 64 in a variety of directions when it is actuated. This is accomplished by configuring pulley 142 to be a section of a right circular cylinder and having the walls of block 140 taper inwardly to form flexed surfaces 143 which intersect with the surface of pulley 142 so that as lanyard 64 is actuated, pulley 142 always provides a rotating bearing surface while flexed surfaces 143 of block 140 provide stationary curved sliding surfaces over which lanyard 64 may be easily moved.

Those familiar with the photographic arts will readily appreciate the novel and unique advantages inherent in this invention. Most importantly, an inexpensive, simple film advancing and processing mechanism with interlock features has been provided.

Since certain changes may be made in the above described photographic apparatus without departing from the scope of the invention herein, it is intended that all matter contained in the accompanying drawings shall be interpreted as illustrative and not in a limiting sense.

What is claimed is:

1. Photographic apparatus comprising:
    means for locating a plurality of film units in position for sequential exposure;
    means for initiating an exposure of a film unit;
    film transport and processing means mounted in position to receive an exposed film unit as it is moved away from said exposure position;
    film advancing means mounted for movement between a first position wherein it is in position to engage the exposed film unit and advance it toward said film transport and processing means and a second position wherein a portion of the exposed film unit is in engagement with said film transport and processing means;
    drive means for moving said film advancing means between said first and second positions and for driving said film transport and processing means;
    means for biasing said film advancing means toward said first position;
    means engageable by said film advancing means during movement of said film advancing means from said first position for preventing said film advancing means from returning to said first position under the force of said biasing means; and
    means responsive to actuation of said initiating means for moving said engageable means out of engagement with said film advancing means thereby allowing said film advancing means to return to said first position under the influence of said biasing means.

2. The apparatus of claim 1 wherein said drive means continuously couples said film advancing means and said film transport and processing means.

3. The apparatus of claim 1 wherein said drive means includes manually operative means.

4. The apparatus of claim 1 further including means coupled to said film advancing means for indicating the number of film units that have been processed.

5. In a photographic apparatus for sequentially effecting exposure and processing of a plurality of self-processable film units arranged in stacked relationship within a cassette, said apparatus having a housing adapted to support the cassette in an exposure position, means for effecting exposure of the film units, film transport and processing means, film advance means including engagement means for moving a film unit out of the exposure position and into engagement with the film transport and processing means which accepts the film until brought into engagement therewith by the film advance means and processes it as it is being transported therethrough, an improvement comprising: an actuatable drive means for supplying energy to power said film advance means and said film transport and processing means;
    means for selectively transferring motion of said actuatable drive means to effectuate in consecutive sequence the energization of first said film advance means and then said film transport and processing means such that said film transport and processing means is not energized until a film unit is engaged therewith; and
    means for preventing the processing of an unexposed film unit.

6. The apparatus of claim 5 wherein said means for preventing the processing of an unexposed film unit includes holding means engageable with said film advance means for preventing said film advance means from moving a film unit from the cassette before a prior engaged film unit has been processed.

7. The apparatus of claim 6 further including means responsive to actuation of said exposure means for moving said holding means out of engagement with said film advance means.

8. The apparatus of claim 5 further including a locating access means coupled to said housing for loading a cassette within said housing, said loading access means being further coupled to said means for preventing the processing of an unexposed film unit by a connecting means that is responsive to the movement of said loading access means such that the movement of said loading access means disenables said means for preventing the processing of an unexposed film unit.

9. The apparatus of claim 5 wherein said actuatable drive means continuously couples said film advance means and said film transport and processing means.

10. The apparatus of claim 5 wherein said actuatable drive means is manually powered.

11. The apparatus of claim 5 further including means coupled to said film advance means for indicating the number of film units that have been processed.

12. Photographic apparatus for use with a cassette of the type having an exposure aperture therein and a plurality of sheet members resiliently biased toward the exposure aperture, the sheet members including an opaque light seal and a plurality of photosensitive film units that are adapted to be sequentially exposed and processed, said apparatus comprising:
    a housing member configured to define a chamber to secure the cassette and support it in a position for effecting exposure of one of the sheet members;
    film advancing means energizable by an actuatable drive means for engaging one of the plurality of sheet members within the cassette and moving such sheet member from the cassette into engagement with a film transport and processing means, said film advancing means being mounted on said housing member for reciprocating movement between a first position corresponding to the exposure location of the cassette and a second position where a portion of an advanced sheet member is brought into engagement with the processing and transport means, said film advancing means being adapted to engage a sheet member whenever said film advancing means is in its first position;
    film transport and processing means energizable by an actuatable drive means for accepting a sheet member brought into engagement therewith by said film advancing means and processing it as it is transported therethrough;
    an actuatable drive means continuously coupled with said film advancing means and said film transport and processing means for supplying energy to power them in consecutive sequence such that said film advancing means is first energized to move it from said first to said second position and then, as a function of said film advancing means being in said second position, said film transport and processing means is energized;

biasing means for continuously urging said film advancing means toward said first position whenever it is not under the influence of a counterapplied force of greater magnitude than that caused by said biasing means; and holding means actuatable by said film advancing means for preventing said film advancing means from returning to said first position under the influence of said biasing means after it has been moved a predetermined distance toward said second position by said drive means thereby preventing said film advancing means from engaging another sheet member before a prior engaged one is brought into engagement with said film transport and processing means.

13. The apparatus of claim 12 wherein said actuatable drive means is manually powered.

14. The apparatus of claim 12 further including means responsive to movement of said film advancing means between said first and second positions for indicating the number of sheet members that have been processed.

15. Photographic apparatus for use with a cassette of the type having an exposure aperture therein and a plurality of sheet members resiliently biased toward the exposure aperture, the sheet members including an opaque light seal and a plurality of photosensitive film units that are adapted to be sequentially exposed and process, said apparatus comprising:

a housing member configured to define a chamber to receive the cassette and support it in a position for effecting exposure of one of the sheet members;

film advancing means energizable by an actuatable drive means for engaging one of the plurality of sheet members within the cassette and moving such sheet member from the cassette into engagement with a film transport and processing means, said film advancing means being mounted on said housing member for reciprocating movement between a first position corresponding to the exposure location of the cassette toward a second position where a portion of an advanced sheet member is brought into engagement with the film transport and processing means which are adapted to engage a sheet member whenever said film advancing means is in said first position;

film transport and processing means energizable by an actuatable drive means for accepting a sheet member brought into engagement therewith by said film advancing means and processing it as it is transported therethrough;

an actuatable drive means continuously coupled with said film advancing means and said film transport and processing means for supplying energy to power them in consecutive sequence such that said film advancing means is first energized to move from said first to said second position and then, as a function of said film advancing means being in said second position, said film transport and processing means is energized;

biasing means for continuously urging said film advancing means toward said first position whenever it is not under the influence of a counterapplied force of greater magnitude than that caused by said biasing means;

a first holding means actuatable by said film advancing means for preventing said film advancing means from returning to said first position under the influence of said biasing means after it has been moved to said second position by said actuatable drive means; and means for releasing said first holding means such that said film advancing means can return from said second to said first position only when said releasing means has been actuated.

16. The apparatus of claim 15 wherein said actuatable drive means is manually powered.

17. The apparatus of claim 15 further including a second holding means actuatable by said film advancing means for preventing said film advancing means from returning to said first position under the influence of said biasing means after it has been moved a predetermined distance toward said second position by said actuatable drive means thereby preventing said film engaging means from advancing another sheet member before a prior engaged one is brought into engagement with said film transport and processing means.

18. The apparatus of claim 15 further including means responsive to movement of said film advancing means for indicating the number of sheet members that have been processed.

19. The apparatus of claim 15 further including exposure means, said releasing means being responsive to the actuation of said exposure means thereby providing an interlock function that prevents an unexposed film unit from being processed.

20. The apparatus of claim 19 further including loading access means coupled to said housing member and said releasing means such that said releasing means is actuatable by said loading access means.

21. In a photographic apparatus for sequentially effecting exposure and processing of a plurality of self-processable film units arranged in stacked relationship within a cassette, said apparatus having a housing defining a chamber configured to receive the cassette and support it in an exposure position, loading access means coupled to the housing and adapted for movement between an open position and closed position such that the cassette may be inserted into or removed from the chamber film transport and processing means, a film advance means adapted to engage a film unit and mounted for movement between a first position corresponding to the exposure position and a second position where a film unit is brought into engagement with the film transport and processing means where it is processed as it is transported therethrough, and a drive means for energizing the film transport and processing means and the film advance means to move it from said first to said second position, an improvement comprising:

holding means for retaining said film advance means in said second position after movement thereto by said drive means; and release means actuatable by said loading access means for disenabling said holding means to permit said film advance means to return to said first position, said release means being actuated whenever said loading access means is moved to said open position.

* * * * *